Patented Jan. 12, 1926.

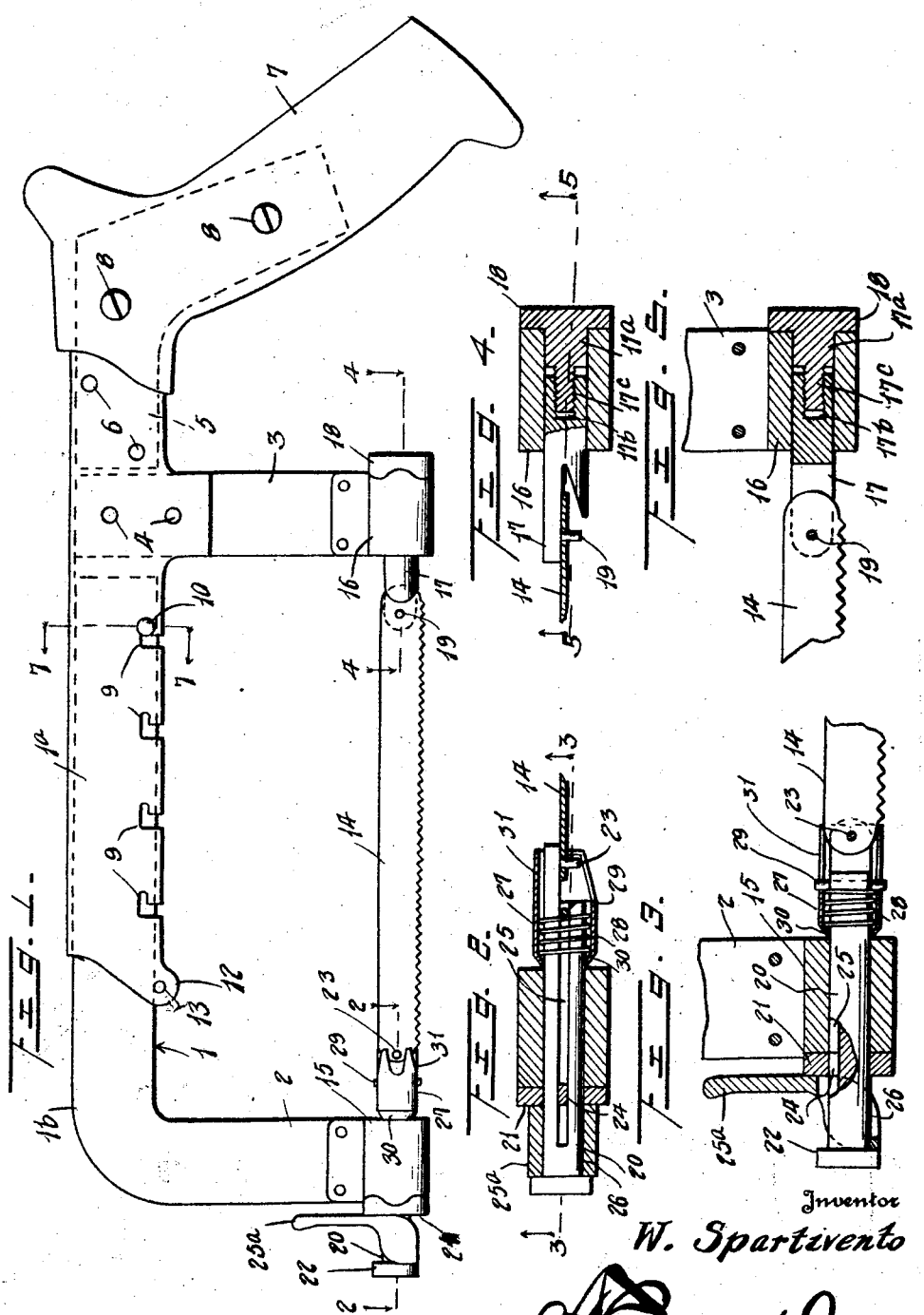

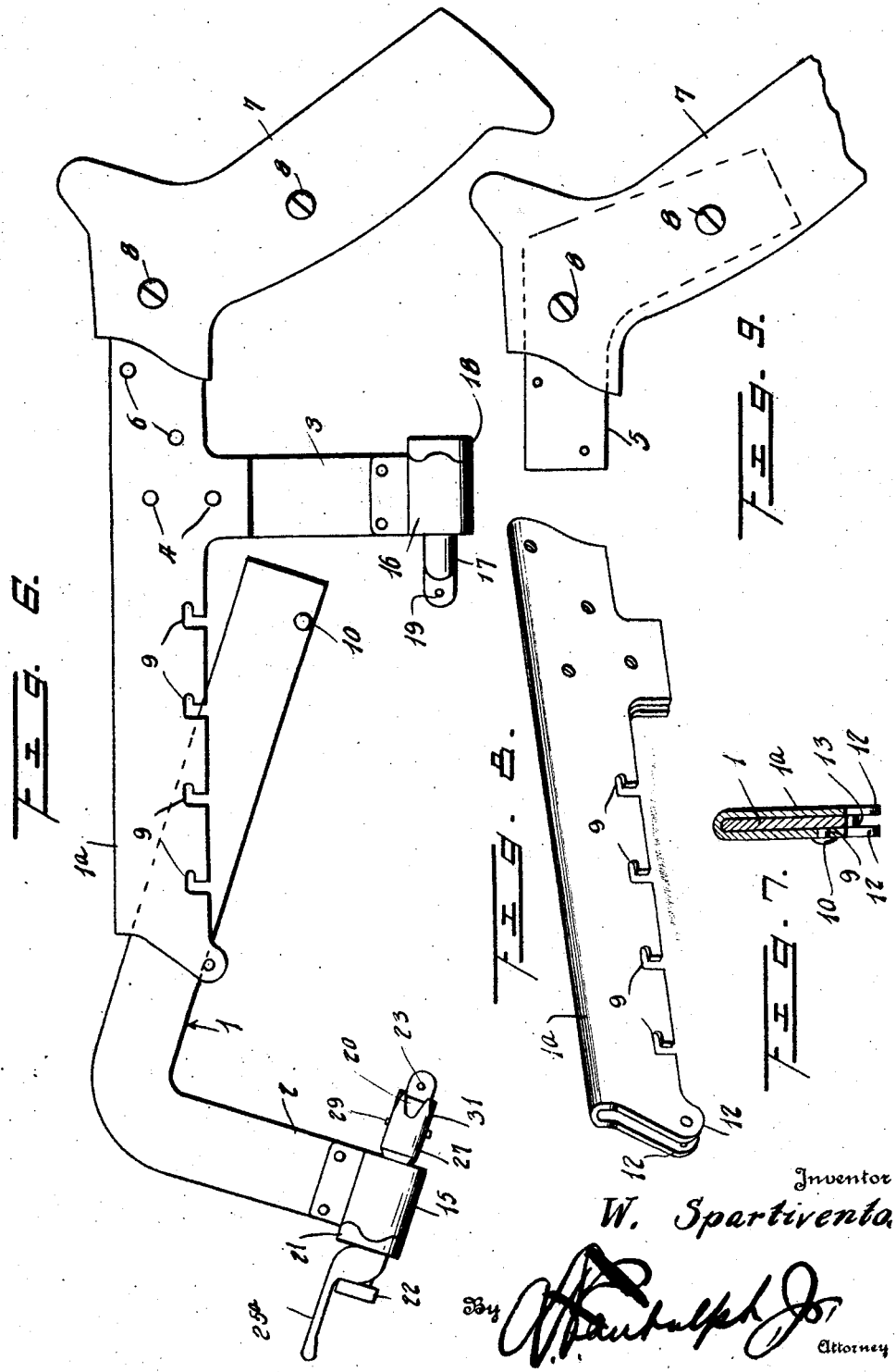

1,569,408

UNITED STATES PATENT OFFICE.

WILLIAM SPARTIVENTO, OF BUFFALO, NEW YORK.

HACK SAW.

Application filed February 7, 1925. Serial No. 7,631.

*To all whom it may concern:*

Be it known that I, WILLIAM SPARTIVENTO, a citizen of the United States, residing at Buffalo, in the county of Erie and State of New York, have invented certain new and useful Improvements in Hack Saws; and I do hereby declare the following to be a full, clear, and exact description of the invention, such as will enable others skilled in the art to which it appertains to make and use the same.

This invention relates to hack saws, and has for one of its objects the provision of a novel and simple hack saw frame of sectional formation, the sections or units of which may be easily and quickly adjusted in order to permit the frame to support saw blades of different lengths.

A further object of the invention is the provision of novel and simple means through the medium of which a saw blade may be easily and quickly secured to or removed from the frame.

With the above and other objects in view, the invention consists in the construction, combination and arrangement of parts hereinafter fully described and claimed, and illustrated in the accompanying drawings, wherein:

Figure 1 is a view in side elevation of a hack saw embodying my invention,

Figure 2 is a detail sectional view taken on the plane indicated by the line 2—2 of Figure 1, Figure 3 is a detail sectional view taken on the plane indicated by the line 3—3 of Figure 2, Figure 4 is a detail sectional view taken on the plane indicated by the line 4—4 of Figure 1, Figure 5 is a detail sectional view taken on the plane indicated by the line 5—5 of Figure 4, Figure 6 is a detail view in side elevation of the saw frame with the sections thereof in the position into which they are first moved when it is desired to increase or decrease the length of the frame, Figure 7 is a detail sectional view taken on the plane indicated by the line 7—7 of Figure 1, Figure 8 is a detail perspective view of the tubular section of the top bar of the frame, and Figure 9 is a detail view in side elevation of the handle and the member by which the handle is secured to the saw frame.

Corresponding and like parts are referred to in the following description, and indicated in the accompanying drawings, by similar reference characters.

The frame of the saw comprises a top bar 1, a front arm 2 and a rear arm 3. The bar 1 is of sectional formation, and the section $1^a$ thereof is hollow to telescopically receive the section $1^b$ thereof. The section $1^a$ has flat sides and is closed at its upper and open at its lower edge. It extends forwardly and rearwardly beyond the rear arm 3 and has the upper end of this arm secured thereto by rivets 4. An angular member 5 has one of its parts secured to and within the rear end of the section $1^a$ by rivets 6. The other part of the member 5 extends downwardly and rearwardly from the section $1^a$ and has a handle 7, which is preferably in the form of a pistol grip, secured thereto by cap screws 8. The section $1^a$ is provided in its sides adjacent the lower edges thereof with a plurality of transversely alined pairs of bayonet slots 9. The vertical portions of the slots 9 open out through the lower edges of the sides of the section $1^a$, and the horizontal portions of said slots extend rearwardly. The section $1^b$ is provided with a pin 10 extending through a pair of the slots 9 and provided at its outer ends with enlarged heads which contact with the outer surfaces of the sides of this section, the pin 10 normally occupying the horizontal portions of the slots through which it passes. A pair of ears 12 extend downwardly and forwardly from the front ends of the sides of the section $1^a$. A pin 13 is secured within the ears 12 for contact with the lower edge of the section $1^b$.

The pins 10 and 13 and the upper closed edge of the section $1^a$ prevent the frame units consisting respectively of the parts $1^a$ and 3 and the parts $1^b$ and 2 from having any relative rocking movement, and the saw blade 14 which is secured to the lower ends of the arms 2 and 3 prevents the frame units from having any relative outward movement. It will thus be seen that when the saw is in use the frame is rigid and that there is no possibility of the units thereof becoming accidentally disconnected.

When it is desired to increase or decrease the length of the frame, the units thereof are moved outwardly with respect to each other to position the pin 10 in alinement with the vertical portions of the slots 9 through which it passes. The frame units are then rocked upwardly and inwardly on the pin 13 to withdraw the pin 10 from the slots 9. The units are then moved endwise with respect to each other to position the pin 10 in alinement with the vertical portions of the selected pair of slots 9, then rocked inwardly and downwardly to carry the pin 10 into the vertical portions of the slots, and thence moved inwardly with respect to each other to carry the pin into the horizontal portions of the slots. After the frame has been adjusted, the blade 14 is secured to the arms 2 and 3, and it will, as hereinbefore stated, prevent the frame units from having any relative outward movement.

The lower ends of the arms 2 and 3 are provided with sleeves 15 and 16, respectively. A stem comprising inner and outer sections 17 and 17$^a$, respectively, one of which is provided with a screw threaded socket 17$^b$ for the reception of a screw threaded stud 17$^c$ on the other, is mounted in the sleeve 16. The stem is provided at its outer end with a head 18 which is scalloped to correspond to the scalloped outer end of the sleeve 16, and at its inner end with a saw blade retaining pin 19. A stem 20 is loose in the sleeve 15, and has a slidable and non-rotatable connection with a washer 21, and is provided at its outer end with a head 22. The washer 21 is scalloped to correspond to the scalloped outer end of the sleeve 15. A saw engaging pin 23 is carried by the inner end of the stem 20. The washer 21 is provided with a diametrical portion 24 which passes through the slot 25 of the stem 20 in order to secure these parts against relative rotation. A levered cam 25$^a$ provided with an opening 26 for the reception of the stem 20, is rotatably, rockably and slidably mounted upon the stem between the head 22 and the washer 21, and provides means by which this stem may be moved outwardly with respect to the sleeve 15 to place the blade 14 under the desired tension. The scalloped head 18 and washer 21 and the scalloped ends of the sleeves 15 and 16 prevent the stems 17 and 20, and consequently the blade 14, from having any rotary movement in the sleeves 15 and 16, and these parts permit the blade 14 to be held in the plane of the frame or in an angular position with respect to such plane. A tubular retainer 27 is slidable upon the inner end of the stem 20 and normally prevents disengagement of the blade 14 from the pin 23. An expansible helical spring 28 is mounted upon the inner end of the stem 20 between a pin 29 carried by the stem and a flange 30 at the inner end of the retainer 27. The spring 28 is compressed when the cam 25 is rocked to draw the stem 20 outwardly, and functions to force the stem 20 inwardly when the cam 25 is rocked to release the stem. The pin 29 passes through slots 31 in the retainer 27.

In practice, after the frame has been adjusted, the blade 14 is applied to the pins 19 and 23. The cam 25 is then rocked to draw the stem 20 outwardly. This movement of the stem 20 tensions the blade 14 and compresses the spring 28 and moves the pin 23 within the retainer 27. To free the saw for removal, it is only necessary to rock the cam 25 downwardly and inwardly whereupon the spring 28 moves the stem 20 inwardly. This movement of the stem 20 carries the pin 23 inwardly beyond the inner end of the retainer 27. When the pin 23 is within the retainer 27 the blade 14 cannot become detached therefrom, while when this pin is inwardly beyond the retainer the saw may be readily removed therefrom.

It should be understood that the drawings are merely illustrative and do not pretend to give exact proportions. Furthermore, the said drawings are illustrative of a preferred construction, it being my expectation that various changes and modifications may be made without departing from the spirit and scope of the invention.

What is claimed is:—

1. A hack saw comprising a frame having a sectional top bar, the rear section of the top bar being hollow and telescopically receiving the front section and provided with bayonet slots, an arm secured to each of said sections, a pin carried by the front section and passing through one of the slots of the rear section, a pin carried by the rear section and contacting with the front section, and a blade connected to the arms.

2. A hack saw comprising a frame, a sleeve carried by the frame and provided with a scalloped outer end, a stem slidably and rotatably mounted in the sleeve and provided at its outer end with a head, a washer mounted on the stem and having a scalloped inner side for engagement with the scalloped end of the sleeve, a cam mounted on the stem between the head and washer for rockable and rotary movements with respect thereto, a second sleeve carried by the frame, a second stem carried by said second sleeve, and saw blade engaging elements carried by the stems.

3. A hack saw comprising a frame, a sleeve carried by the frame and provided with a scalloped outer end, a stem slidably and rotatably mounted in the sleeve and provided at its outer end with a head, a washer mounted on the stem and having a scalloped inner side for engagement with the scalloped end of the sleeve, a cam mounted on the stem between the head and sleeve for rockable, rotary and sliding movements with respect thereto, a second sleeve carried by the frame, a second stem carried by the second sleeve, and saw blade engaging elements carried by the stems.

In testimony whereof I affix my signature.

WILLIAM SPARTIVENTO.